United States Patent Office 3,376,050
Patented Apr. 2, 1968

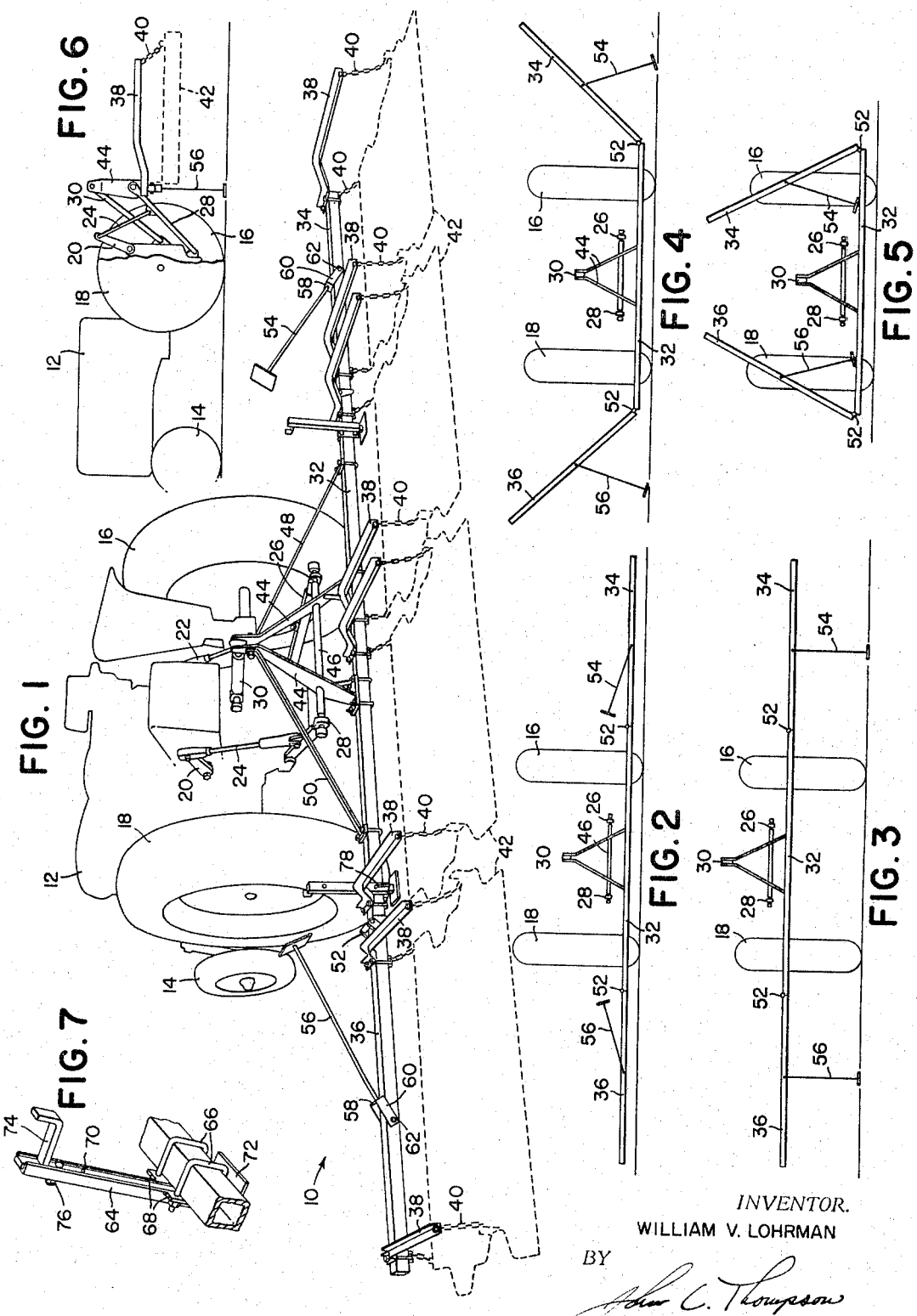

3,376,050
INTEGRAL DRAWBAR WITH FOLDABLE SECTIONS
William Vinall Lohrman, Davenport, Iowa, assignor to Deere & Company, Moline, Ill., a corporation of Delaware
Filed Aug. 11, 1966, Ser. No. 571,880
4 Claims. (Cl. 280—411)

This invention relates generally to agricultural implements and more particularly to integral drawbars carried by the three-point hitch of a farm tractor, the drawbars having foldable outer sections.

In integral drawbars having foldable outer sections it has not been customary to provide means to assist the operator in folding the outer sections. Thus the operator must necessarily lift the outer sections into their folded positions. However as tractor horsepower has increased so has the length of the pivoted outrigger sections until today it is quite difficult to lift these heavy sections into their folded transport positions. Therefore, it is the principal object of this invention to provide means cooperable with an integral drawbar whereby the lifting of outrigger sections into their transport positions may be facilitated.

More specifically, it is an object of this invention to provide means carried by the outrigger sections which may be disposed below the outrigger sections when the main frame has been raised to cause the outrigger frames to move into a partially folded position when the main frame section of the integral drawbar is caused to be lowered by the three-point hitch of a tractor.

These and other objects and advantages of this invention will be apparent to those skilled in the art after a consideration of the following detailed description, taken in conjunction with the accompanying drawings in which the preferred form of this invention is illustrated.

FIG. 1 is a perspective view of an integral drawbar secured to the three-point hitch of a conventional farm tractor, the integral drawbar having foldable outrigger sections to which the folding legs of this invention have been secured.

FIGS. 2, 3, 4 and 5 are schematic rear views of a foldable integral drawbar showing the manner in which it may be folded according to the principles of this invention.

FIG. 6 is a side view of the integral drawbar carried by the three-point hitch of a tractor when it is in its raised position shown in FIG. 3.

FIG. 7 is a perspective view of the supporting stand used to hold the outrigger frame in its folded position.

In the following description right-hand and left-hand reference is determined by standing to the rear of the integral drawbar and facing the direction of travel.

The integral drawbar of this invention, which is indicated generally at 10, is shown secured to a conventional farm tractor 12 having front wheels 14 and right and left rear wheels 16 and 18. The tractor is also provided with a generally conventional three-point hitch which includes rock arms 20 to which right and left lift links 22 and 24 are secured at their upper ends, the lower ends of each lift link being secured to pivoted rearwardly extending draft links 26, 28. The three-point hitch also includes a conventional compression link 30.

The integral drawbar includes a main frame section 32 and a pair of outrigger frames 34 and 36. Both the main frame section and the outrigger frame sections consist essentially of a transversely extending bar. Carried by each of the sections is a plurality of rearwardly extending lift arms 38 which carry by means of chains 40 earth-working implements 42 which may be, for example, spike-toothed sections.

The main frame section 32 carries a mast which may be secured to the vertically movable three-point hitch of the tractor. The mast includes a pair of upwardly converging plates 44 which carry between their spaced apart parallel upper ends a transverse pin (not shown) which may be secured to the rear end of the compression link 30. A transversely extending bar 46 extends between and through the plates 44 and is provided with a reduced diameter portion adjacent its ends to receive the rear ends of the right and left lower draft links 26 and 28. The mast is provided with braces 48 and 50 which are secured at their upper ends adjacent the pin (not shown) and at their lower ends to spaced apart portions of the main frame section 32.

The right and left outrigger sections 34 and 36 are pivotally secured to the sides of the main frame section 32 and are movable about pivot pin means 52 between an extended horizontal working position shown in FIGS. 1 and 2 to a folded transport position shown in FIG. 5. To facilitate the folding of the outrigger sections right and left folding legs 54 and 56 are provided. When the outrigger sections are in their extended horizontal working positions the folding legs are normally disposed in an inoperative position over the outrigger sections 34 and 36 as can be seen clearly in FIGS. 1 and 2. It should be noted that in this position the bight 58 of the bifurcated end 60 of each of the legs rests on top of the outrigger section, the bifurcated portion 60 being apertured to receive pin 62 which is passed through the apertures in the bifurcated portion 60 and a corresponding aperture (not shown) in the outrigger sections to hold the folding leg in place.

To raise the outrigger frame sections from the position shown in FIG. 2 to the position shown in FIG. 5 it is first necessary to raise the main frame section 32 through means of the three-point hitch of the tractor to the position shown in FIG. 3. At this time the pins 62 are pulled and the folding legs 54 and 56 are placed in the position shown in FIG. 3 and the pins 62 are then reinserted within the apertures of the outrigger sections 34 and 36. The main frame section is then lowered through the three-point hitch of the tractor to the position shown in FIG. 4 which causes a partial folding of the outrigger sections 34 and 36. It is necessary then to complete the folding manually but since the outrigger sections are already partially folded much less effort is required than if it were necessary to fold the sections from the position shown in FIG. 2. After the sections 34 and 36 are in their folded position, the folding legs 54 and 56 are repositioned as shown in FIG. 5.

A support means is provided to hold the outrigger frame sections 34 and 36 in their folded positions, this support means including a channel member 64 which is rigidly secured to the main frame section by a pair of U-bolts 66, the ends of which are received within apertured flanges 68 that are integral with the channel member 64. Disposed within the channel member 64 is an elongated stand 70 having a lower ground-engaging portion 72 and a forwardly extending outrigger supporting portion 74. Upper and lower pins 76 (FIG. 7) and 78 (FIG. 1) hold the stand in selected positions of vertical adjustment within the channel member 64.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:
1. The method of folding an integral drawbar having a main frame section carried by vertically movable three- point hitch means on a tractor and outrigger sections pivotally secured to the sides of the main frame section and movable between a horizontal working position and a folded transport position, each outrigger having folding legs movable between an inoperative position over the outrigger and a supporting position below the outrigger, said method comprising the steps of raising the three-point hitch to raise the main frame and outrigger sections, positioning the folding legs in their supporting position below the outriggers, lowering the three-point hitch to cause the outrigger sections to move to a position between the horizontal and folded positions as the main frame section is lowered, and manually completing the folding operation.

2. For use with a tractor having a three-point hitch, an integral drawbar comprising a main frame section, a pair of outrigger frame sections pivotally secured to the sides of the main frame section and movable between an extended horizontal working position and a folded transport position, a pair of folding legs, and means operable to secure each of said folding legs either in an operative position in which the leg extends downwardly from said associated outrigger section to engage the ground or in an inoperative position, the legs being of such length that when the folding legs are in their operative position and the main frame section and outrigger sections are in a raised horizontal position, that lowering of the main frame section will cause the outrigger frame sections to become partially folded.

3. The invention set forth in claim 2 in which said folding legs have an apertured bifurcated portion at one end, and said means operable comprises a pin insertable through the apertured bifurcated portion and a corresponding aperture in said outrigger section.

4. The invention set forth in claim 3 in which means are provided to support the outrigger frames in their folded transport position comprising a pair of supporting means supported adjacent the sides of the main frame section, each supporting means including a channel member rigidly secured to the main frame section, an elongated stand movable within said channel and having a lower ground-engaging portion and a forwardly extending outrigger supporting portion, and pin means cooperating with said channel and stand to hold said stand in various positions of adjustment.

References Cited
UNITED STATES PATENTS

| | | | |
|---|---|---|---|
| 2,800,758 | 7/1957 | Schmied. | |
| 2,978,042 | 4/1961 | Jones | 172—456 X |
| 3,183,982 | 5/1965 | Kopaska | 172—624 |
| 3,337,241 | 7/1967 | Neuhring | 280—411 |

LEO FRIAGLIA, *Primary Examiner.*